US007367878B2

(12) United States Patent
Jensen et al.

(10) Patent No.: US 7,367,878 B2
(45) Date of Patent: May 6, 2008

(54) METHOD AND APPARATUS FOR USE IN REMOVAL OF INTERNAL BONES IN A FORE-END

(75) Inventors: Carsten Jensen, Roskilde (DK); Jesper Mejslov, Borup (DK); Arne Druekaer, Jaegerspris (DK); Helge Moeller, Charlottenlund (DK)

(73) Assignee: Slagteriernes Forskningsinstitut, Roskilde (DK)

( * ) Notice: Subject to any disclaimer, the term of this patent is extended or adjusted under 35 U.S.C. 154(b) by 0 days.

(21) Appl. No.: 11/382,650

(22) Filed: May 10, 2006

(65) Prior Publication Data
US 2006/0234615 A1 Oct. 19, 2006

Related U.S. Application Data

(60) Division of application No. 10/747,630, filed on Dec. 29, 2003, now Pat. No. 7,104,878, which is a continuation of application No. PCT/DK02/00459, filed on Jul. 2, 2002.

(30) Foreign Application Priority Data
Jul. 3, 2001 (DK) .......................... PA 2001 01047

(51) Int. Cl.
A22C 22/00 (2006.01)
(52) U.S. Cl. ..................................... 452/135
(58) Field of Classification Search .................. None
See application file for complete search history.

(56) References Cited
U.S. PATENT DOCUMENTS
1,435,877 A 11/1922 Reubold

| 3,774,265 | A | | 11/1973 | Anderson et al. |
| 3,811,152 | A | | 5/1974 | Herubel |
| 4,097,960 | A | | 7/1978 | Graham et al. |
| 4,146,945 | A | * | 4/1979 | Hotard ........................ 452/160 |
| 4,327,633 | A | | 5/1982 | Leining et al. |

(Continued)

FOREIGN PATENT DOCUMENTS

| DE | 2235733 B2 | 2/1973 |
| DE | 4421882 | 11/1995 |
| EP | 0719501 A1 | 7/1996 |
| FR | 2329208 A1 | 5/1977 |
| GB | 1 448 940 | 9/1976 |
| WO | WO 9320703 A1 | 10/1993 |

*Primary Examiner*—Thomas Price
(74) *Attorney, Agent, or Firm*—Marshall, Gerstein & Borun LLP

(57) ABSTRACT

In the removal of internal bones in a fore-end of a split carcass the shank bone, the humerus bone and the shoulder blade are cut free by machine, so that subsequently they can easily be removed from the rest of the fore-end. A transport tool (27a) is brought to grip around the free end of the shank bone. The fore-end is then pulled past cutting tools (1, 9, 15) by means of the transport tool, and the cutting tools (1, 9, 15) hereby perform cutting operations along the shank bone, the humerus bone and the shoulder blade guided by these bones, so that the bones are at least partially cut free from the rest of the fore-end. The articulations between the shank bone and the humerus bone, and the connections of the humerus bone to the shoulder blade are maintained at least partially unbroken during the cutting operations, so that the tractive force from the transport tool (27a) by the grip of the tool round the free end of the shank bone is transferred to the bones via their unbroken connections.

14 Claims, 13 Drawing Sheets

U.S. PATENT DOCUMENTS

| | | | |
|---|---|---|---|
| 4,337,550 A | * | 7/1982 | Baylor et al. ............... 452/160 |
| 4,628,569 A | | 12/1986 | Gagliardi, Jr. |
| 4,706,335 A | * | 11/1987 | Schram et al. .............. 452/163 |
| 5,108,344 A | | 4/1992 | Debey |
| 5,462,477 A | | 10/1995 | Ketels |
| 5,542,879 A | | 8/1996 | Kunig et al. |
| 5,655,960 A | * | 8/1997 | Van Horeebeck ........... 452/160 |
| 5,855,507 A | | 1/1999 | Fisher et al. |
| 6,027,405 A | * | 2/2000 | Leining et al. ............. 452/160 |

* cited by examiner

Fig. 9
Fig. 11
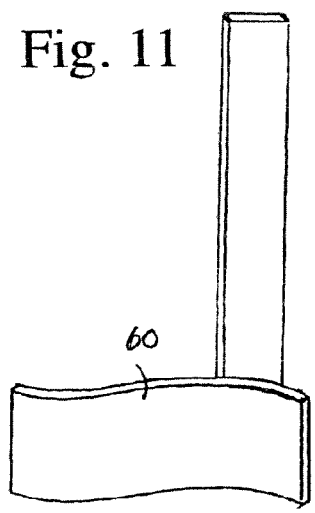
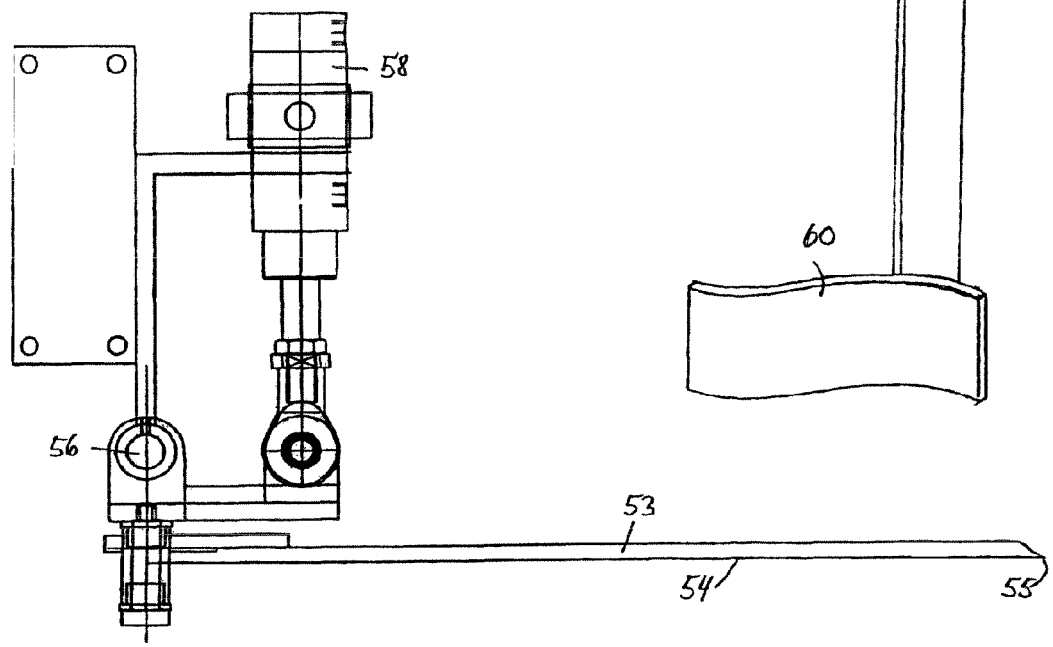
Fig. 10
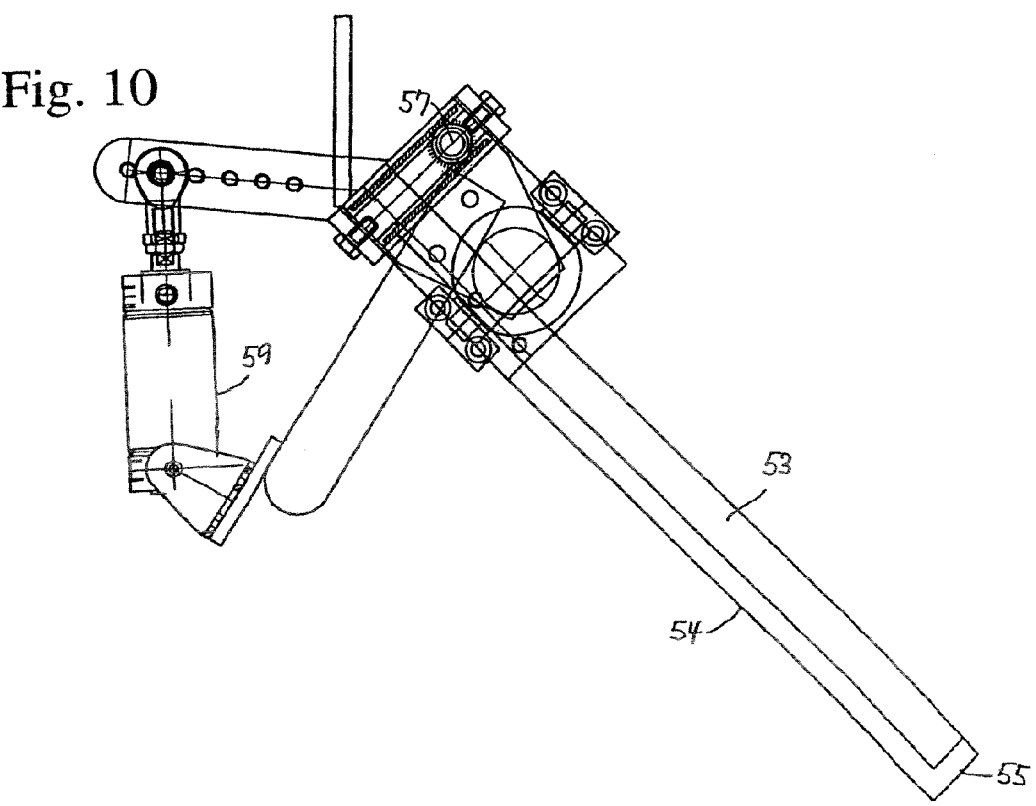

METHOD AND APPARATUS FOR USE IN REMOVAL OF INTERNAL BONES IN A FORE-END

REFERENCE TO RELATED APPLICATIONS

This application is a divisional of, and is entitled to the same benefits and priority as, U.S. patent application Ser. No. 10/747,630, filed Dec. 29, 2003, now U.S. Pat. No. 7,104,878, which is a Continuation of International Application No. PCT/DK02/00459, having an international filed date of Jul. 2, 2002, which designated the United States of America, and further claimed priority to Denmark patent application PA-200101047, filed Jul. 3, 2001.

FILED OF DISCLOSURE

The present invention relates to a method and an apparatus for use in removal of internal bones in a fore-end of a split carcass, preferable a pig carcass, whereby the internal bones in the fore-end, i.e. the shank bone, the humerus bone and possibly the shoulder blade, are at least partly cut free by machine.

BACKGROUND

Processing of fore-ends in the boning rooms of slaughterhouses comprises a long series of manual operations, the purpose of which is to remove bones, cartilage and sinews, and which serves to separate and trim the muscles. The operations require experienced operators in order to achieve a good meat yield. The work is a strain on the operators, especially the removal of the internal bones. There has long been a need for a mechanization of the process, but the auxiliary apparatuses known up to now can only be used for removal of single bones and therefore the processing is still highly demanding for the operators.

There exist for example machines and apparatuses, which can extract a shoulder blade. DK 144.404 B (Slagteriernes Forskningsinstitut) describes an apparatus, which extracts the shoulder blade from a bacon side by means of a hook. First, a manual separation is performed between the humerus bone and the shoulder blade. Then, the shoulder blade is extracted in the longitudinal direction of the blade, so that the shoulder blade pocket remains intact, which is important by bacon sides. EP 0468 010 B1 (Slagteriernes Forskningsinstitut) describes an apparatus for extraction of the shoulder blade from a fore-end, which is to be separated into meat parts. The apparatus extracts the shoulder blade by means of a hook. The extraction is performed in a direction at right angles to the plane of the shoulder blade.

EP 0832 563 B1 (Slagteriernes Forskningsinstitut) suggests an automated, partial boning of fore-ends by first fixing the fore-end and then cutting the bones completely or partially free from the meat. It is suggested to remove the shank bone and the shoulder blade and partially loosening the humerus bone from a fore-end by fixing the fore-end, determining an anatomical fixed point and moving a gripper in to this part of the bone, which is to be removed. After the gripper has gripped around the bone, a cutting operation is performed along the bone guided by this by means of tools on the gripper. The disadvantage of this known technique is that each individual fore-end has to be fixed before the gripper are activated and that the tools has to be used each one individually on the fixed fore-end. The result of this is a poor coefficient of utilization of each individual tool and it makes the process fairly slow.

The only apparatus known today that can bone fore-ends without surface bone in one process uses a press with two matrices, which squeezes the meat away from the shoulder blade, the shank bone and the humerus bone. Most slaughterhouses prefer to maintain the manual boning, as the apparatus damages the meat structure, resulting in meat of a reduced value. Furthermore, there will be splinters of bone in the meat.

Thus, the problem with the known apparatuses and methods is that they cannot perform a boning operation of fore-ends at a high speed and with good utilization of tools if an acceptable meat quality after the boning operation is to be achieved.

SUMMARY

According to the present invention it has surprisingly proved that it is possible to perform an at least partially mechanical free-cutting of shank bone, humerus bone and possibly shoulder blade by pulling the fore-end past a series of cutting tools, by means of a transport tool which grips around the free end of the shank bone, and in this pulling process let the articulations between the shank bone and the humerus bone, and possibly between the humerus bone and the shoulder blade remain unbroken, so that the tractive force is transferred between the bones. After such an at least partially mechanical free-cutting operation, the bones can fairly easily be removed from the rest of the fore-end, by machine or manually. The principle has the advantage that the boning speed becomes high, as each cutting tool, immediately after it has been working on one fore-end, can work on the next fore-end without the processing of the first fore-end needs to be completed. This gives a better utilization of individual tools, and the meat structure is not damaged during the process.

The method according to the invention is characterized in that a transport tool is brought to grip the free end of the shank bone, that the fore-end is pulled past cutting tools by means of the transport tool, that the cutting tools hereby perform cutting operations along the shank bone and the humerus bone guided by these bones to free-cut these at least partially from the rest of the fore-end, and that the articulations between at least the shank bone and the humerus bone and possibly also the connections of the humerus bone to the shoulder blade are maintained at least partially unbroken during the cutting operations, so that the tractive force from the transport tool by the grip of the tool around the free end of the shank bone is transferred to the bones via their unbroken connections.

As the articulations are maintained sufficiently unbroken, the tractive force, which is needed to pull the fore-end past the cutting tools and thus perform the cutting operations, can be transferred from the transport tool to the fore-end by one connection, i.e. the connection to the free end of the shank bone.

One embodiment comprises that at least one cutting tool is also guided by the shoulder blade to perform cutting operations along this for loosening from the rest of the fore-end. The cutting tool can be the one, which is used to cut along the shank bone and the humerus bone for loosening these, or it can be a separate tool. Free-cutting of the shoulder blade can serve as a preparation for a manual or automatic extraction of the shoulder blade from the fore-end.

Another embodiment of the method according to the invention comprises that the fore-end is supported on a transport plane during the cutting operations, e.g. a conveyor belt.

The cutting tools can be suspended flexibly, so that during the cutting operation they are flexibly loaded against the shank bone, the humerus bone and/or the shoulder blade. In this way the cutting operations can be performed close to the bones, so that no more meat than necessary is wasted, and at the same time the location of the tools will be adjusted for variations in the sizes and geometries of the fore-ends.

Before the transport tool is brought to grip around the free end of a shank bone a machine can make two cuts along opposite sides of the shank bone near its free end, so that the transport tool can grip down into these two cuts and obtain contact with the shank bone.

The shank bone, the humerus bone and possibly the shoulder blade can after the cutting operations with the cutting tools be moved in a direction upwards from the transport plane of the fore-end, while the rest of the fore-end is kept at the transport plane by retaining means, whereby the shank bone and the humerus bone and possibly the shoulder blade are removed from the fore-end.

The apparatus according to the invention is characterized in that it comprises:

a transport tool with grippers which can be brought to grip around the free end of the shank bone, a transport device for the transport tool to pull the fore-end along a transport path, and cutting tools arranged along the transport path to perform cutting operations along the shank bone and the humerus bone, guided by these bones to at least partial free-cut these from the rest of the fore-end when the fore-end is pulled past the cutting tools.

At least one cutting tool can also be guided by the shoulder blade to perform cutting operations along this for loosening from the rest of the fore-end.

In an embodiment the apparatus comprises a transport plane, e.g. a conveyor belt to support the fore-end during the cutting operations.

The cutting tools can be suspended flexibly, so that during the cutting operation they are flexibly loaded against the shank bone, the humerus bone and/or the shoulder blade.

The apparatus can comprise a cutting tool which is designed to perform two cuts along opposite sides of the shank bone near its free end before the transport tool is brought to grip around the free end of the shank bone, so that the transport tool can grip down into these two cuts and obtain contact with the shank bone.

In an embodiment the apparatus comprises a transport device which is designed to transport the shank bone, the humerus bone and possibly the shoulder blade in a direction upwards from the transport plane of the fore-end after the cutting operations with the cutting tools, and retaining means which are designed to keep the rest of the fore-end at the transport plane while the shank bone, the humerus bone and possibly the shoulder blade are transported in a direction upwards from the transport plane, whereby the shank bone, the humerus bone and possibly the shoulder blade are removed from the fore-end. The transport device can be the same as the first mentioned transport device, or it can be a separate transport device that will take over the transportation of the fore-end before the extraction of the shoulder blade.

The invention also relates to devices and a knife tool for use in the method and the apparatus according to the invention.

The positioning device according to the invention to place the free end of the shank of a fore-end in a transport tool is characterized in that it comprises a conveyor belt to transport the fore-end with the shank in front in the direction towards the transport tool, a funnel device to guide the free end of the shank to fit tightly against the narrowed part of the funnel, a gripper to grip the shank when the free end is in the narrowed part of the funnel device, means to move the funnel device away from the fore-end when the gripper has gripped around the shank, and a transport device to move the gripper with retained fore-end with shank in front until the free end of the shank is placed in the transport tool.

The device can comprise a cutting tool to perform two cuts along opposite sides of the shank bone near its free end before the gripper grips around the shank.

The transport device according to the invention for conveying fore-ends with the shank in front with the fore-ends retained in each of their own transport tool is characterized in that it comprises a conveyor with a continuous chain of transport tools, each of which has means to grip and retain the free end of the shank of a fore-end that is supplied at the entrance end of the conveyor.

Each transport tool can comprise a frame placed across the transport direction, in which frame the shank can be retained by displacement of the frame transversely to the transport direction.

The extraction device according to the invention for extraction of the shank bone and the humerus bone and possibly the shoulder blade from a fore-end which is supplied supported on a transport plane, and in which fore-end the bones are at least partially cut free from the rest of the fore-end, is characterized in that it comprises a transport device which is designed to move the shank bone, the humerus bone and possibly the shoulder blade in a direction upwards from the transport plane of the fore-end, and retaining means which are designed to keep the rest of the fore-end at the transport plane while the shank bone, the humerus bone and possibly the shoulder blade are moved in a direction upwards from the transport plane, whereby the shank bone, the humerus bone and possibly the shoulder blade are removed from the fore-end.

The knife tool according to the invention is characterized in that it comprises a blade and a motor to turn the blade around an axle that is at right angles to the plane of the blade, that the blade at a distance from the axle has two cutting edges which meet in a point, and that one of these cutting edges is located to the inward side of the circular arc that the point describes when the blade is turned around the axle in the direction of the point, and the other cutting edge to the outward side of the circular arc, whereby the parts of the cutting edges have increasing distance from the circular arc in the direction backwards from the point. The internal cutting edge can have the shape of an arc with a smaller radius than the circular arc that the point describes when the blade is turned, and the external cutting edge can have the shape of all arc with a bigger radius than the circular arc that the point describes.

The present invention is explained in more detail in the following with reference to the drawings.

BRIEF DESCRIPTION OF THE SEVERAL VIEWS OF THE DRAWINGS

FIG. 11 shows a boom, which puts M. Serratus Ventralis aside after it has been loosened by the tool in FIGS. 9 and 10.

DETAILED DESCRIPTION

The apparatus and the tools in FIGS. 1-4 are designed to process right pig fore-ends from which ribs, neck bone and breast bone have been removed, e.g. by means of a machine, see EP 0938 264, EP 1059 037 and EP 101 8888 (Slagteriernes Forskningsinstitut). An operator has removed the neck fillet and made minor preparation works for the mechanical process.

Figure 1:
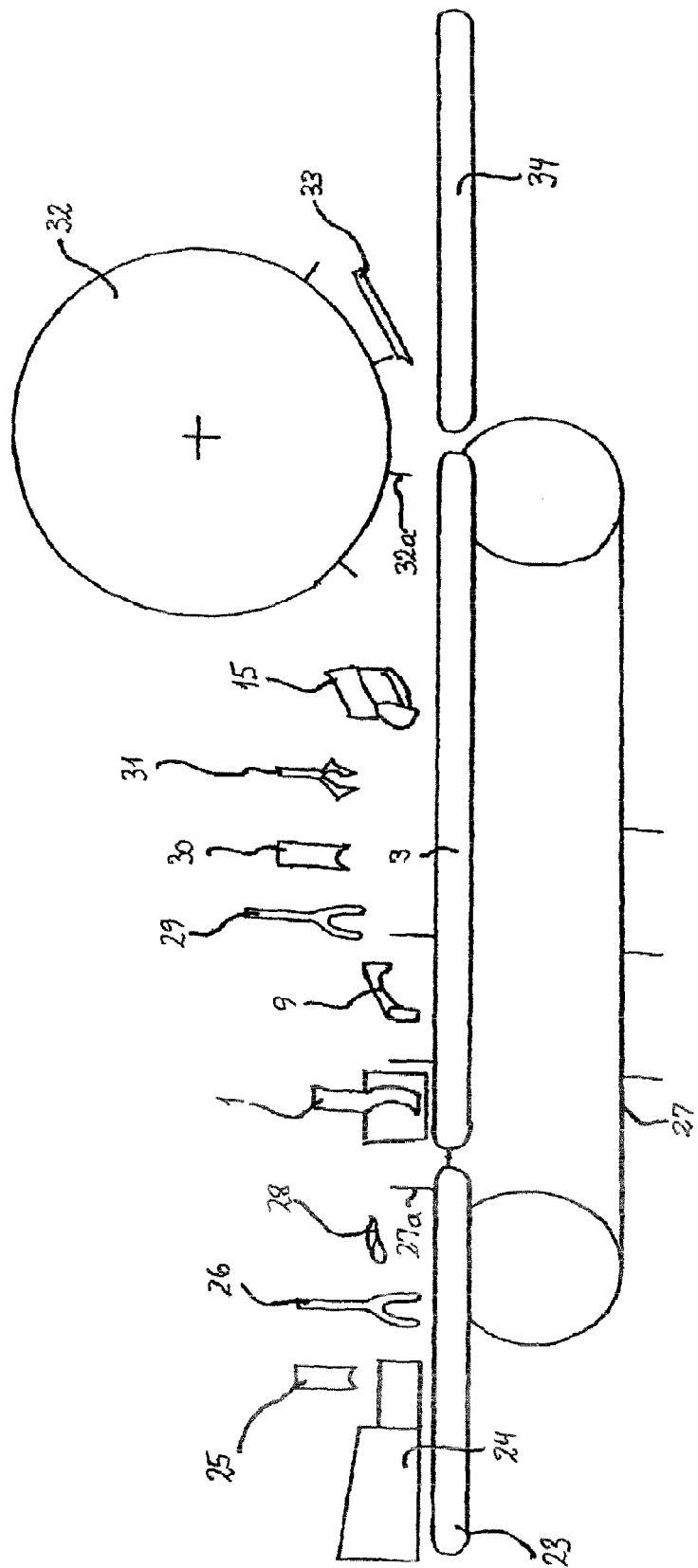
FIG. 1 shows a first embodiment of an apparatus according to the invention for processing of right pig fore-ends.

The apparatus processes the fore-ends in a continuous process with conveyance of the fore-ends from the left to the right in FIG. 1. At the extreme left a fore-end enters a conveyor belt 23 and is conveyed into a receiving house 24 with the shank in front. A cutting tool 25 free-cuts the free end of the shank bone, and a fork 26 conveys the fore-end to a transport device 27 for engagement with a transport tool 27a in the device. The transport device then conveys the fore-end past various cutting tools that are placed in succession in the transport direction and perform a partial free-cutting of the shank bone, the humerus bone and the shoulder blade. The fore-end is supported by a transport plane 3, which can be a conveyor belt.

After the cutting tools have cut along the bones in the fore-end, this is transferred to a second transport device 32 with transport tool 32a The transport tool 27a releases the fore-end as soon as it has been gripped by a transport tool in the second transport device 32. The shank bone, the humerus bone and the shoulder blade are then extracted in a gradual process, the transport device 32 pulling the coherent bones upwards while a stop device 33 keep down the rest of the fore-end (the meat part). The meat part is caught and moved away by a conveyor belt 34.

The tools and the processes are now described in more detail:

The fore-end is conveyed to the apparatus with the rind side downwards and the free end of the shank bone pointing forwards in the transport direction of the apparatus. The conveyor belt 23 conveys the fore-end to the funnel-shaped receiving house 24, the inside shape of which fits the free part of the shank. The conveyor belt drives the fore-end forward until the free end of the shank bone hits the bottom of the receiving house, whereby the house swings back in its pivoting suspension and activates a switch, which stops the movement of the conveyor belt.

The cutting tool 25 for free-cutting of the free end of the shank bone is moved upwards through the downwards-turned, open side of the receiving house and cuts into the free part of the shank with a knife blade on either side of the shank bone. The receiving house 24 constitutes a stop device when the knife blades cut into the shank. The two knife blades are loaded against each other, e.g. spring-loaded, so that the cut is laid as closely to the bone as possible. The vertical cutting edge of the knives are shaped with a flat side facing the bone, and a side which is oblique in proportion to the flat side, so that the knife blades, when they are driven along the bone in the direction of the cutting edges, are actuated towards the bone. The knife blades are driven by a driving mechanism in the direction towards the free end of the shank bone, so that the cutting edges cut the meat from the sides of the shank bone from the point of insertion and to the free end of the shank bone.

Then, the receiving house 24 is lifted and the cutting tool 25 is lowered, so that the fore-end can be moved in the transport direction. From above a fork 26 goes down into the two cut tracks that have been formed by the tool 25 and pulls the fore-end a distance in the direction of the transport device 27.

The transport device 27 comprises a continuous chain of transport tools 27a which are moved around at a fairly even movement by means of a driving mechanism. A transport tool 27a at the up-stream end is moved up into a track in the transport plane 3, upon, which the fore-end is supported, and grips around the shank bone on the shank that has been carried forwards by the fork 26. The fore-end is then conveyed, by the pull of the transport tool in the shank bone, in the transport direction with the even movement of the transport tool. It is not necessary for the functioning of the invention that the transport tool shall grip around the shank bone from below. In other solutions the transport tool is located above the transport plane and it goes down gripping the shank bone.

The fore-end is conveyed by the transport tool 27a past a knife tool 28, which has a horizontal, oblique knife, the cutting edge of which is mainly parallel with the transport plane and goes slantwise from right to left seen in the transport direction. This stationary knife loosens M. Serratus Ventralis when the fore-end is moved towards the cutting edge. A fixed rail, which goes slantwise from left to right, lays the loosened M. Serratus Ventralis to the right, so that it is not damaged during the subsequent operations.

Figure 2:
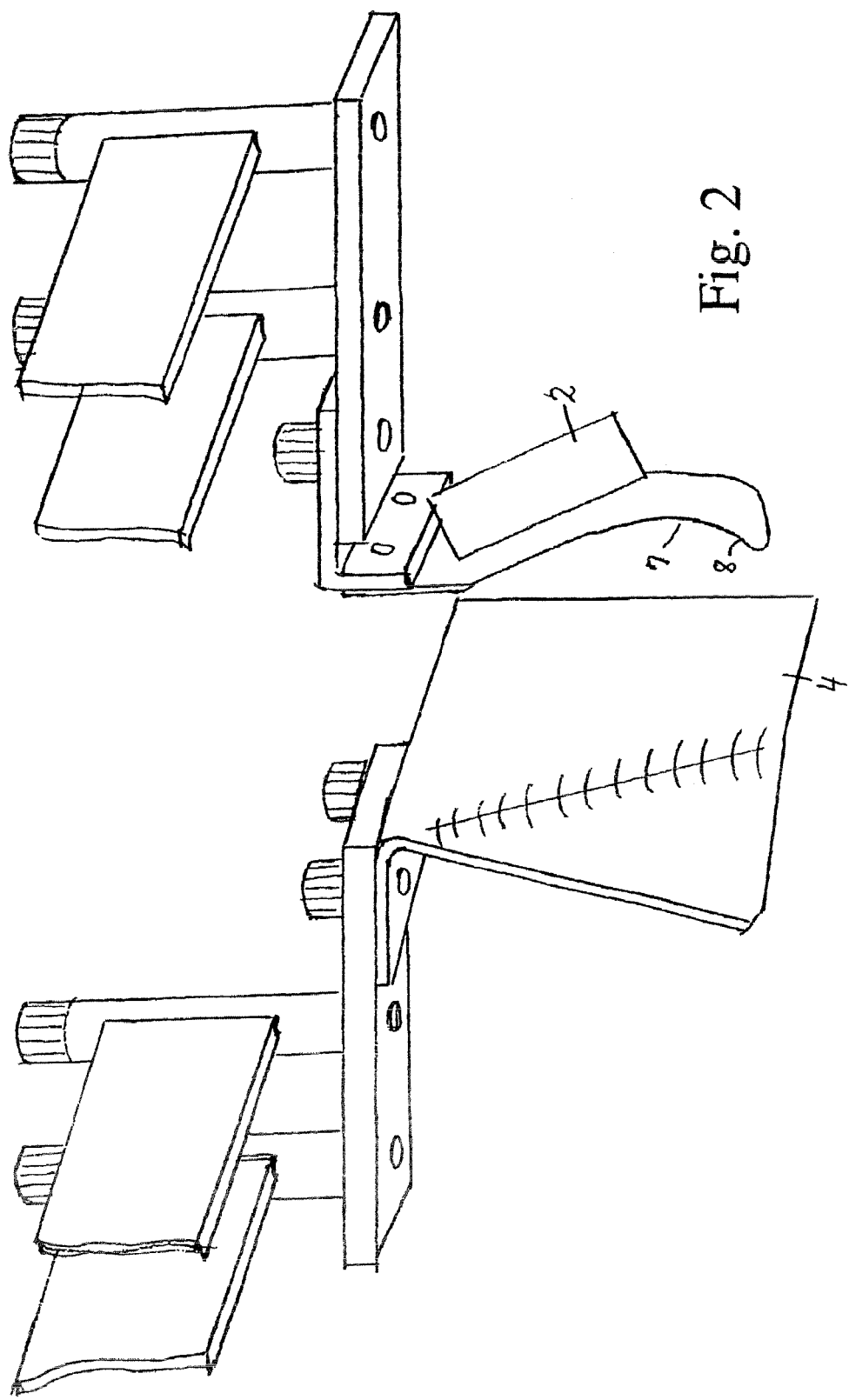
FIG. 2 shows a cutting tool in the apparatus for free-cutting of the right side of the shank bone and humerus bone.

The fore-end is then conveyed past a knife tool 1 for free-cutting of the right side of the shank bone and the humerus bone. FIG. 2 shows details of the tool. It comprises a knife 2, which is designed to slide along the right side of the two bones, and a stop part 4, which is to press the fore-end towards the knife 2 while it is pulled past the tool 1, and furthermore is to press the fore-end downwards towards the transport plane 3 by means of an up-stream, lower corner, which is bent outwards to the left. The stop part 4 is spring loaded against the knife 2. When the humerus bone has passed the knife 2, the stop part 4 is pressed towards the left by the fore-end part with the shoulder blade in it, and the rest of the fore-end is conveyed past the knife 2, which partially cuts through it. The knife 2 is vertically oriented with a curve to the left (towards the bone) and a curve 7 pointing forward. Together they have the effect that: the bones are placed in the curve pointing forward when they are moved past the tool. The knife 2 has a cutting edge 8, which is designed so that the knife 2 is moved inward towards the bones when it cuts meat.

Figure 3:
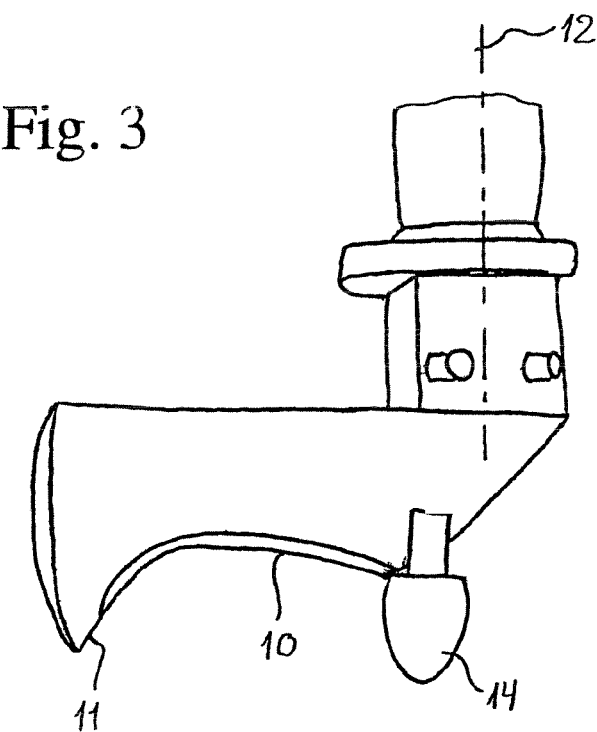
FIG. 3 shows a cutting tool to cut along the topside of the humerus bone.

After this, the fore-end is moved to a knife tool 9, which is shown in more detail in FIG. 3. The tool includes a horizontal cutting edge 10 and vertical cutting edge 11, which is arranged near the left end of the horizontal cutting edge 10 and is mainly at right angles to this. The tool is suspended in such a way that it can turn round a mainly vertical axis 12, which is arranged near the right end of the horizontal cutting edge 10. A driving means can move the tool upwards and downwards. The tool is also provided with a downwards-directed guide pin 14.

When the fore-end is conveyed to the tool 9, this is raised above the transport plane 3, and the horizontal cutting edge 10 is mainly transverse to the transport direction. The position of the tool in the transverse direction is such that the track, which has been cut in the fore-end by the previous tool 1 will be placed right under the guide pin 14. When the transport tool 27a arrives at a certain position, the mentioned driving means will be activated, moving the tool 9 downwards, so that it hits the humerus bone approx. 165 mm from the free end of the shank bone and penetrates to the shank bone. At the same time the guide pin 14 moves downwards into the mentioned track. The top side of the humerus bone will be scraped free from meat by the movement of the fore-end in proportion to the tool 9, and the force in the transport direction that is thereby exerted on the tool 9 creates a torque on the tool 9 round the axis 12, so that the vertical cutting edge 11 is turned inwards to engage with the top part of the left side of the humerus bone and scraps this free from meat. A sensor registers at which force the tool 9 is affected in the transport direction. The tool 9 is raised when this force exceeds a certain maximum, which occurs when the horizontal cutting edge 11 arrives at the shoulder neck of the humerus bone.

While the tool 9 is raised, a forked guiding tool 29 is lowered, the two prongs of which are moved into the track on the right side of the humerus bone, formed by the tool 1, and into the track on the left side, formed by the tool 9. The position in which the forked guiding tool is to be lowered is controlled by the position of tool 9. When the left-hand prong hits the shoulder neck the fork is turned, which at a certain angle releases a vertically moving punching knife 30 that cuts free the right side of the shoulder joint and the shoulder blade neck, and a pair of tongs 31 which is moved down above and around the shoulder blade neck in order to free-cut this and cut through the superficial digital flexor muscle. The transverse position of the punching knife and of the pair of tongs is controlled by the transverse position of the forked guiding tool.

Figure 4:
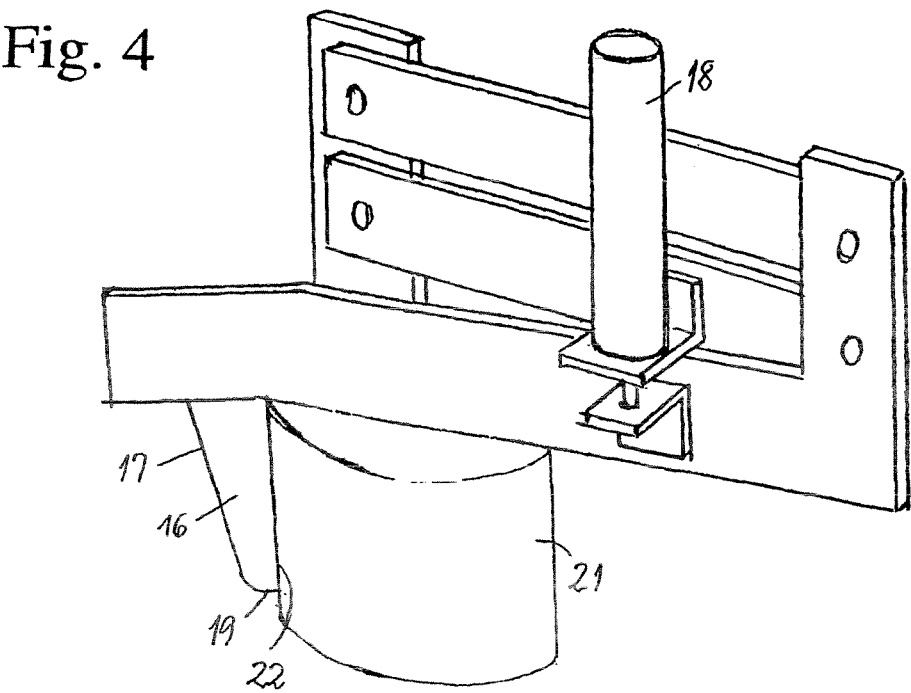
FIG. 4 shows a cutting tool to cut along the left side of the humerus bone and the edge of the shoulder blade as well as the joint between these.

To cut free the left side of the humerus bone and the shoulder blade and the left edge of the shoulder blade the fore-end is conveyed past a knife tool 15, which is shown in more detail in FIG. 4, seen from the down-stream side. The tool comprises a first blade 16, which is located on a parallel guidance. The blade curves outwards to the left and has a vertical cutting edge 17, which is shaped in such a way that by the cutting of the meat it is led inwards against the bone. The blade has the special curved design in order to be able to cut free the left side of the humerus bone. The cutting edge 17 continues at the bottom end into a horizontal cutting edge 19. The tool is moved inwards against the humerus bone so that the blade 16 cuts along the left side of the bone. When the shoulder neck reaches the blade 16, this is pressed upwards. The blade 16 is loaded downwards, by means of a driving means 18, at a certain force, against which it moves upwards. The horizontal cutting edge 19 free-scrapes the topside of the left edge of the shoulder blade, while a second blade 21 in the tool free-scrapes the left side of the shoulder neck, the joint and the left-hand side of the shoulder blade. The second blade 21 is curved to the right, opposite the first blade 16, and has a vertical cutting edge 22, which is shaped opposite of the vertical cutting edge 17 of the first blade 16, so that the second blade 21 can slide off against the left edge of the shoulder blade. The second blade 21 engages with the fore-end when the first blade 16 is raised, and while the second blade 21 free-scrapes the left edge of the shoulder blade it simultaneously controls the transverse position of the first blade 16.

The use of the tool 15 does not depend on whether the punching knife 30 and the pair of tongs 31 have been used and vice versa, and the order of the processes is therefore arbitrary.

After the above-mentioned cutting processes have been performed, the three coherent bones, the shank bone, the humerus bone and the shoulder blade, are released from the rest of the fore-end. This entails that the underside of the shank bone and the humerus bone may have to be cut free and that the bones shall be pulled upwards and free from the rest of the fore-end. In order to perform this process the fore-end is transferred from the first transport device 27 to the second transport device 32, the transport tool 32a engaging with the free end of the shank bone, after which the transport tool 27a in the first transport device 27 is released from the shank bone, The transport tool 32a in the transport device 32 is arranged on a circular guidance, which is placed above the transport plane 3, but alternatively it can be arranged on a continuous chain, which is driven above the transport plane. The transport tool 32a is moved in the transport direction of the transport plane while it engages with the shank bone of the fore-end. Then it is moved upwards slantwise while the horizontally arranged stop device 33 keep the meat part of the fore-end down. A cutting device may be provided which device comprises a number of horizontal, elastic steel fingers that each has a horizontal, transverse cutting edge, and by its position is suitable for cutting the connection between the meat part of the fore-end and the humerus shank bones, where the meat part and the bones are forced from each other by the upwards movement of the bones, which is caused by the transport device 32 and the retention of the rest of the fore-end near the transport plane caused by the stop device 33. With or without a cutting device, the vertical movement of the tool 32a of the transport device 32 has the effect that the bones are pulled free in one piece from the rest of the fore-end, the articulation between the shoulder blade and the humerus bone and the articulation between the humerus bone and the shank bone still being mainly unbroken, and therefore can transfer to the shoulder blade the tractive force that the transport device exerts on the shank bone.

With that, the process is completed and the fore-end has been divided into the coherent bones: shank bone, humerus bone and shoulder blade, and the rest of the fore-end, which is one coherent, boned meat piece, which can be carried on by the conveyor belt 34 to subsequent processing.

The transport device 32 can, in a special embodiment, comprise aggregates which are designed to grip around the humerus bone and/or the shoulder blade in case the articulation between the shank bone and the humerus bone or the articulation between the humerus bone and the shoulder blade is not sufficiently strong to stand up to the tractive force to pull the shoulder blade free by means of the shank bone, e.g. because of damage caused by the free-cutting operation. As there are individual variations in the length of the individual bones, the mentioned aggregates are preferably designed in such a way that they only engage with the respective bones if an articulation is broken or partially broken and the fore-end does not follow the movement of the second transport device. The distance between the part that grips around the lower end of the shank bone and the mentioned aggregate/aggregates can thus advantageously be so that the aggregate or aggregates only engage with the respective bones when the distance between the point of engagement of the aggregate, which will be close to the joint head where the bone is getting thicker, and the place of engagement with the shank bone exceeds a known, maximum distance between the two places of engagement for coherent bones.

The apparatus and the tools, which are shown in FIGS. 5-16 are similarly designed to process right pig fore-ends, from which ribs, neck bone and breastbone have been removed, and where an operator has prepared the fore-end for the mechanical operation. In this case the operator has not removed the neck fillet.

Figure 5:
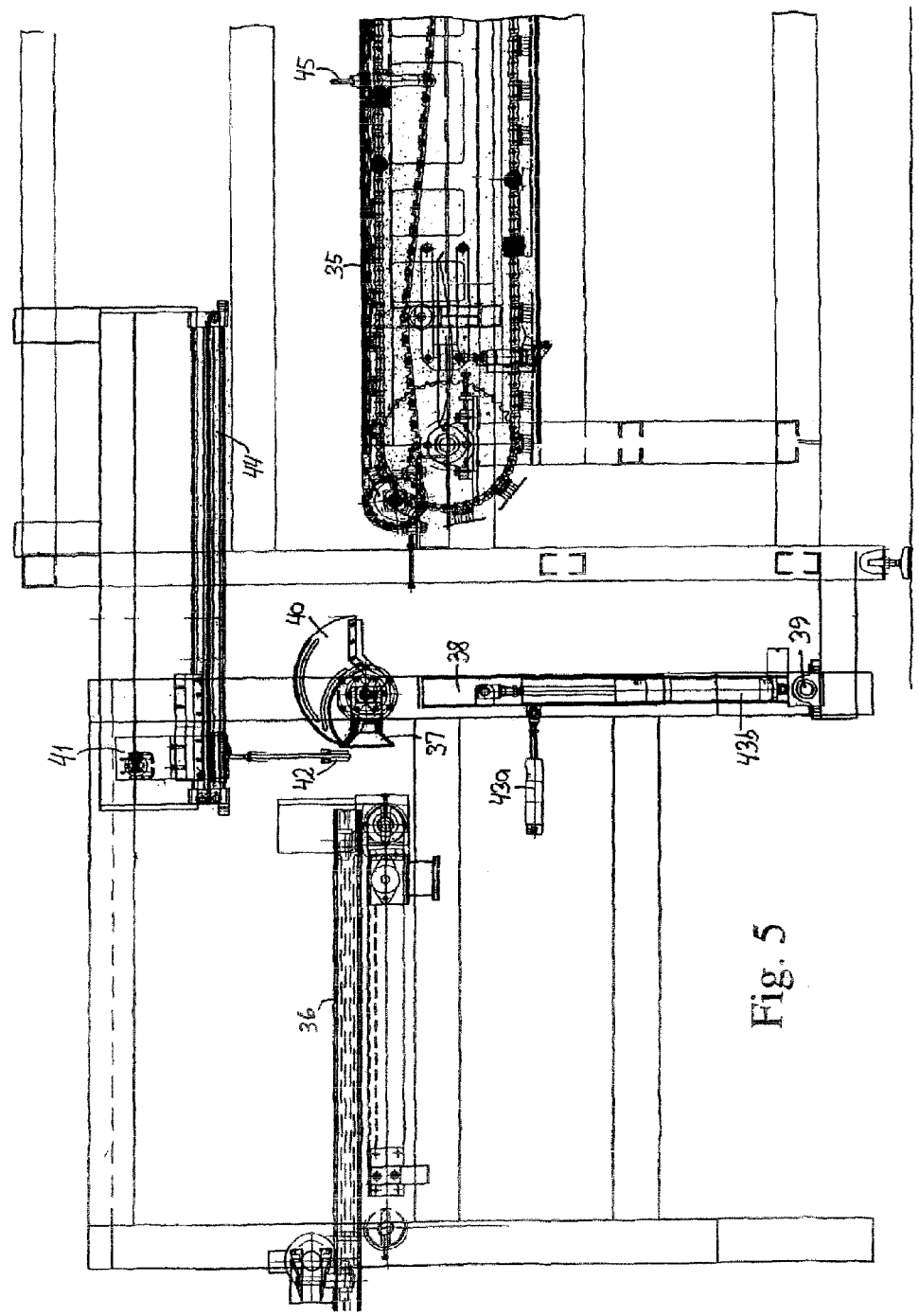
FIGS. 5-6 show a second embodiment of an apparatus according to the invention for processing of right pig fore-ends.
Figure 6:
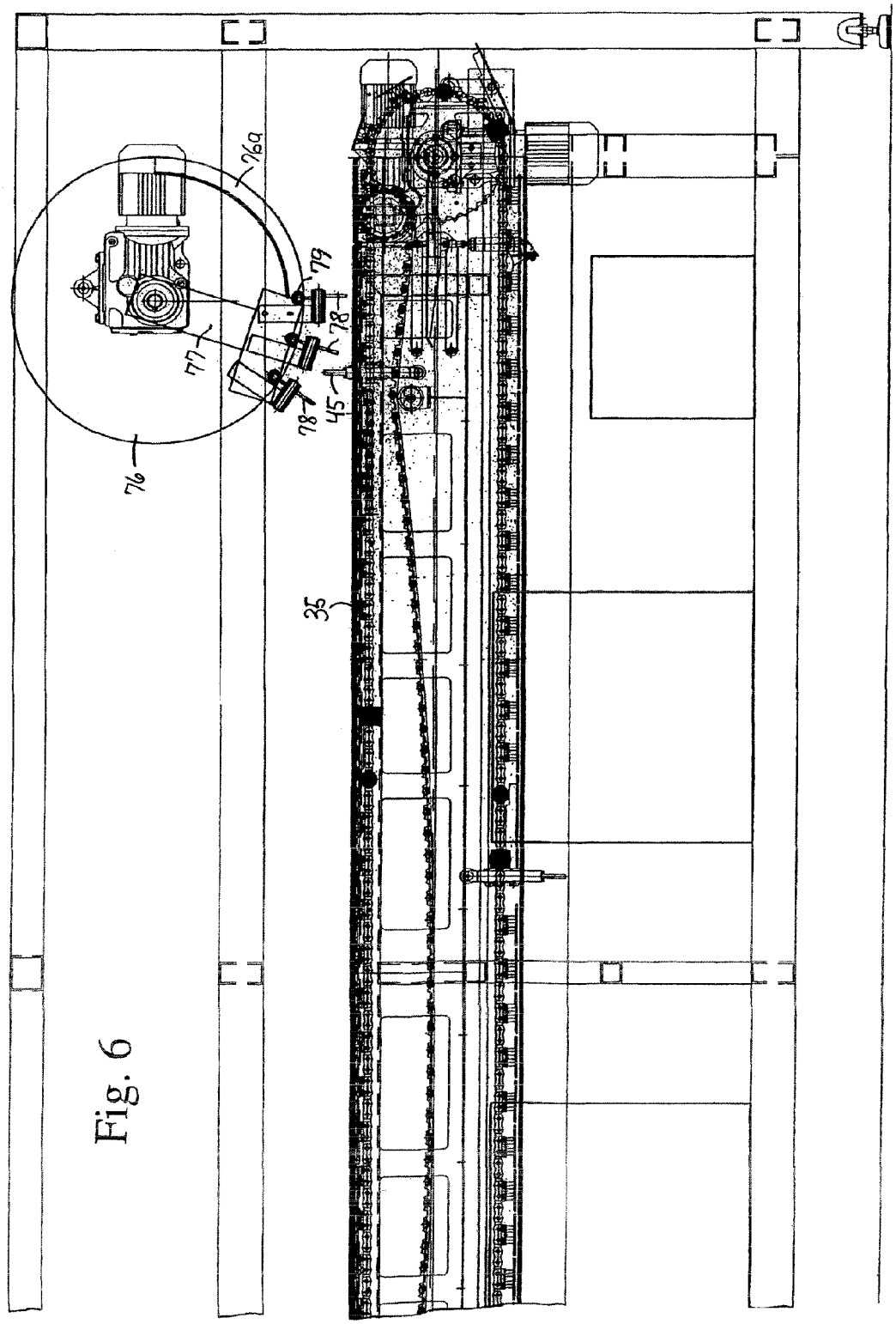

The has a feeding part, which is shown to the left in FIG. 5, and an extraction part, which is shown to the right in FIG. 6, and between these parts there is a processing section with a conveyor and processing tools, of which only the conveyor 35 is shown in FIGS. 5 and 6.

Figure 5A:
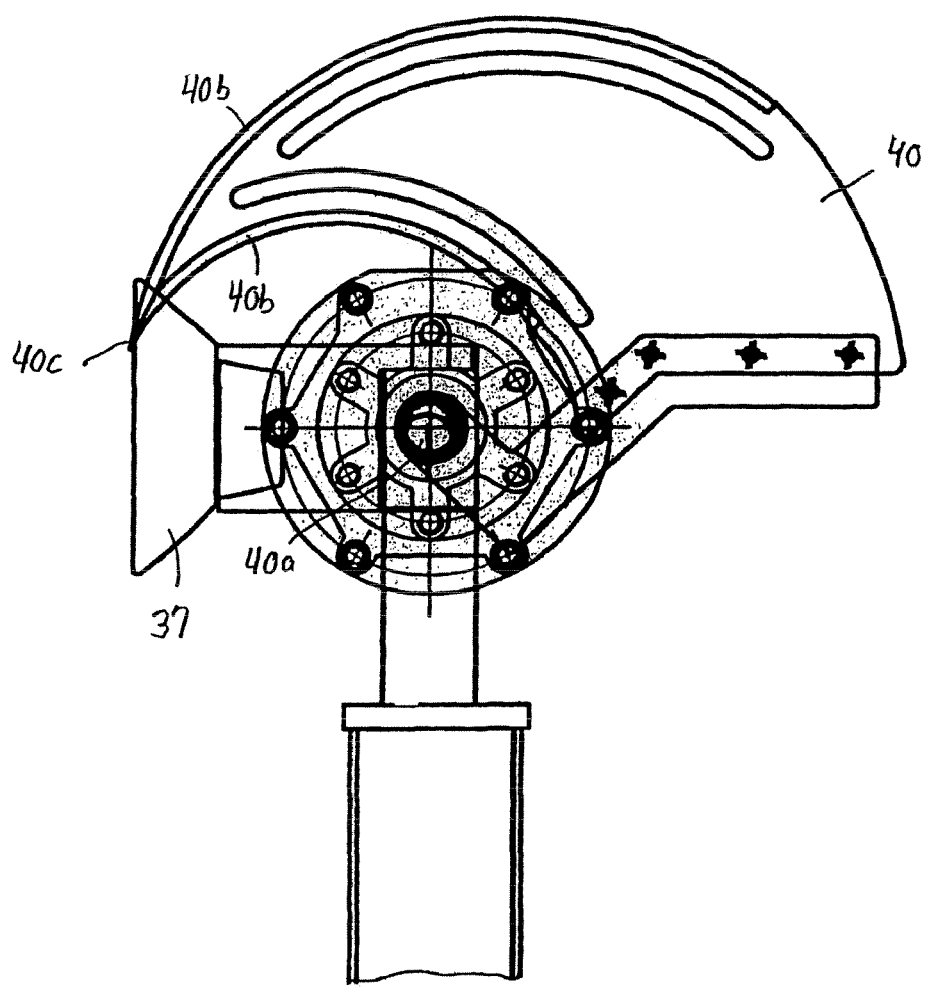
FIG. 5a shows a cutting tool in the apparatus for free-cutting along the shank bone.

The feeding part comprises a guiding device 36 with five conveyor belts, which drives a fore-end at the top, at the bottom and on the sides forward to a cup 37. The cup is fastened to a swivel arm 38 which can swivel round an axle 39. The cup 37 is funnel-shaped with the wide, open end facing the guiding device 36. When the conveyor belts drives the fore-end forwards in the direction of the shank the free end of the shank bone is guided into the cup 37, which is pressed backwards to a certain position, which is detected by a sensor which registers the angular motion of the swivel arm 38. The sensor transmits a signal to a control device, which stops the conveyor belts in the guiding device 36. Two blades 40, which are pivotally mounted on the arm 38, cut alternately on either side of the shank bone near its free end so that the bone end is cut free. The cup 37 and one of the blades 40 are seen more clearly in FIG. 5a The blade 40 can be rotated round an axle 40a by means of a motor and it has two cutting edges 40b, which meet in a point 40c. When the blade is rotated in the direction of the point, the point will enter the meat of the shank and slide off against one side of the shank bone. The inward cutting edge cuts along the shank bone in the direction towards the free end of the shank bone, whereas the outward cutting edge cuts along the shank bone away from the free end of the shank bone. The cutting edges move slantwise away from the circular arc which the point describes, in such a way that the free end of the shank is pulled inwards against the bottom of the cup during the cutting operation. Preferably, the blade is resilient sideways, so that it can lie close to the bone. The cup 37 is provided with slits through which the blades can pass during the cutting operation.

The feeding part has a loader 41 (FIG. 5) with a claw 42, which after the free-cutting operation can be swung down and grips the free end of the shank bone. When the claw 42 has engaged with the shank bone the cup 37 is swung away and down by activation of two air cylinders 43a and 43b. Two plates are pushed in from either side to support the fore-end. The claw 42 can now freely be moved forwards along a rail 44 in the loader 41, so that the shank of the fore-end is conveyed into a gripper 45 in a transport tool, which is delivered by the conveyor 35.

Figure 8:
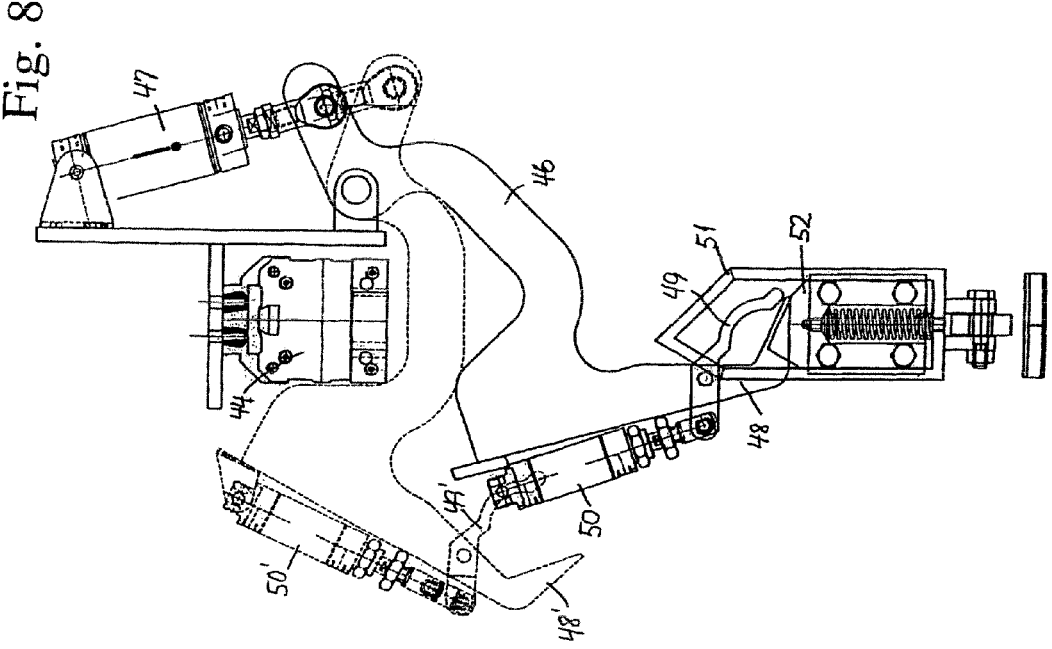
FIG. 8 shows details of the apparatus in FIGS. 5-6, FIGS. 9 and 10 show a cutting tool for cutting of M. Serratus Ventralis, seen from in front and from above respectively.
Figure 7:
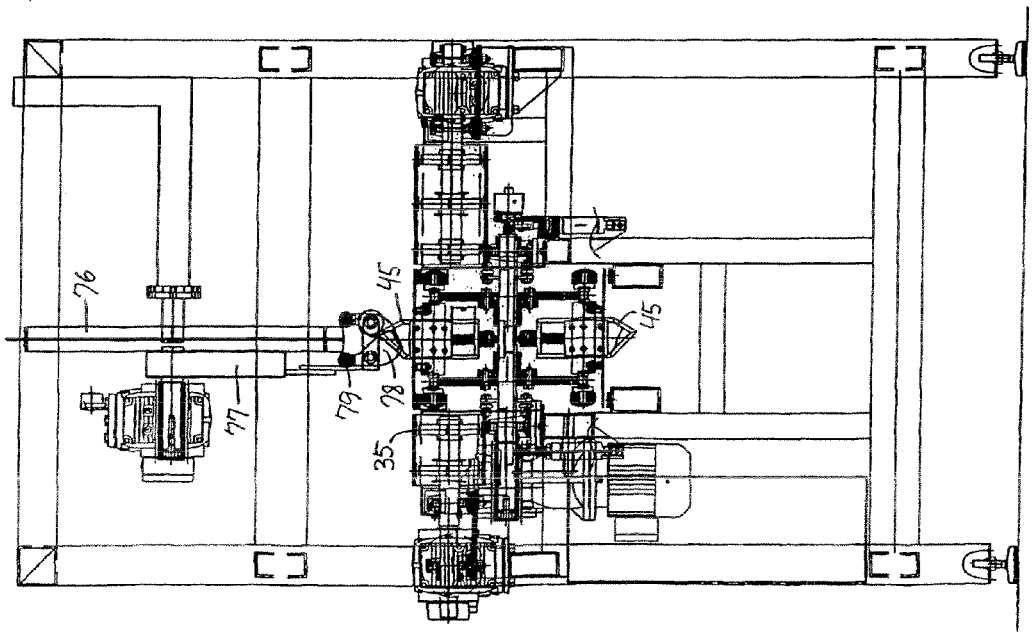
FIG. 7 shows the apparatus in FIGS. 5-6 seen from the end.

The claw 42 and the gripper 45 are shown in detail in FIG. 8. The claw is mounted on a swivel arm 46, which is displaceable along the rail 44 and can be swung inwards to and away from the path of the fore-end by means of an air cylinder 47. The claw has a fixed jaw part 48 and a movable jaw part 49, which can be moved inwards against and away from the fixed jaw part 48 by means of an air cylinder 50. The parts are shown in full-drawn line in the active position of the claw, where the claw grips around the shank bone, and in dotted line in the inactive position of the claw, where the jaw parts have moved away from each other. In the inactive position the parts have the same reference numbers as in the active position, but they bear a mark (').

The gripper comprises a clamp or a frame 51, which in the open position allows the free end of the shank bone to enter the opening of the clamp. When the claw 42 has placed the free end of the shank bone in the clamp, the claw will release its grip and at the same time the gripper is activated, whereby the frame is pulled down towards a pressure part 52 so that the free end of the shank bone is squeezed firmly.

The conveyor 35 (FIG. 5) comprises a conveyor belt which supports the fore-end and through with the frame and the pressure part stand out. The gripper 45, together with other similar grippers for other fore-ends, is fastened to a continuous chain in the conveyor. When the chain is driven around, the fore-ends fixed in the grippers and supported on the conveyor belt are conveyed in the transport direction of the conveyor and past the below-mentioned knife tools, which cause a partial free-cutting of the bones from the rest of the fore-end.

The first knife tool that the fore-end is conveyed past comprises a knife 53 for M. Serratus Ventralis, which knife is shown in FIGS. 9-10 and serves to loosens the M. Serratus Ventralis of the fore-end. The knife is an oblong, sabre-like knife with two cutting edges 54 and 55. The cutting edge 54 extends in the longitudinal direction of the knife, whereas the cutting edge 55 extends across this at the end of the knife. The knife is fastened on the rack of the apparatus in the left side seen in the direction of conveyance. The knife is angled in such a way that it points slantwise forwards towards the arriving fore-end at an angle of approx. 45.degree. It is connected with the rack by means of two swivel parts 56, 57, which make it possible to tilt the knife 53 up and down and to swing it to the side by means of two air cylinders 58 and 59.

When a fore-end arrives, the knife 53 is swung in above the conveyor 35, and it is tilted upwards so that the gripper 45 does not collide with the knife. When the gripper passes the knife, the knife will tilt down so that it stands on the gripper with a certain pressure. When the gripper has passed, the knife slides down onto the shank bone and loosens M. Serratus Ventralis. After a brief period of engagement with the meat, the knife 53 swings outwards to the left, so that the neck is not spoiled. A certain distance after the gripper has passed, a boom 60 strikes down on the fore-end, see FIG. 11. The shape and position of the boom enables the loosened M. Serratus Ventralis to be laid to the same side as the neck. When the fore-end has passed, the knife 53 and the boom 60 return to the initial position.

An angular knife with a horizontal guiding part and a downwards pointing leg with cutting edge is then moved down on top of the shank bone, and while the horizontal guiding part defines the vertical position and with that the cutting depth by sliding on top of the shank bone, the cutting edge on the downwards pointing leg loosens the heavy tendon attachment on the right side of the shank bone immediately before the joint between the shank bone and the humerus bone.

Figure 12:
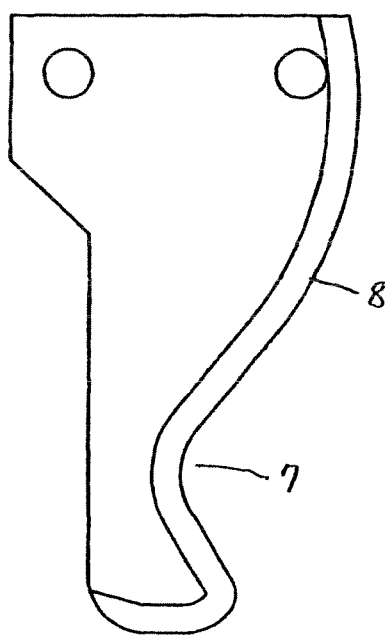
FIG. 12 shows a knife for free-cutting of the shank bone and the humerus bone up to the joint between the humerus bone and the shank bone.
Figure 13:
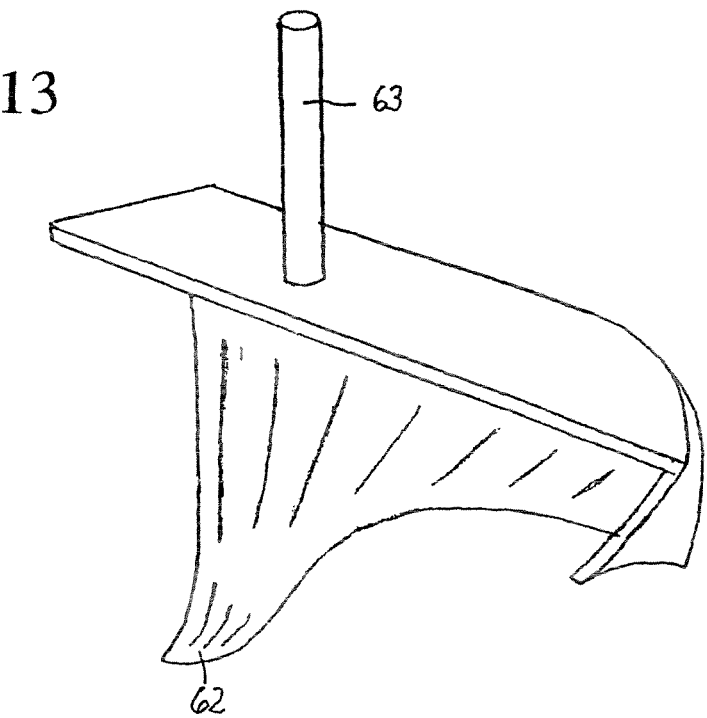
FIG. 13 shows a knife for cutting of the left side of the shank bone.
Figure 14:
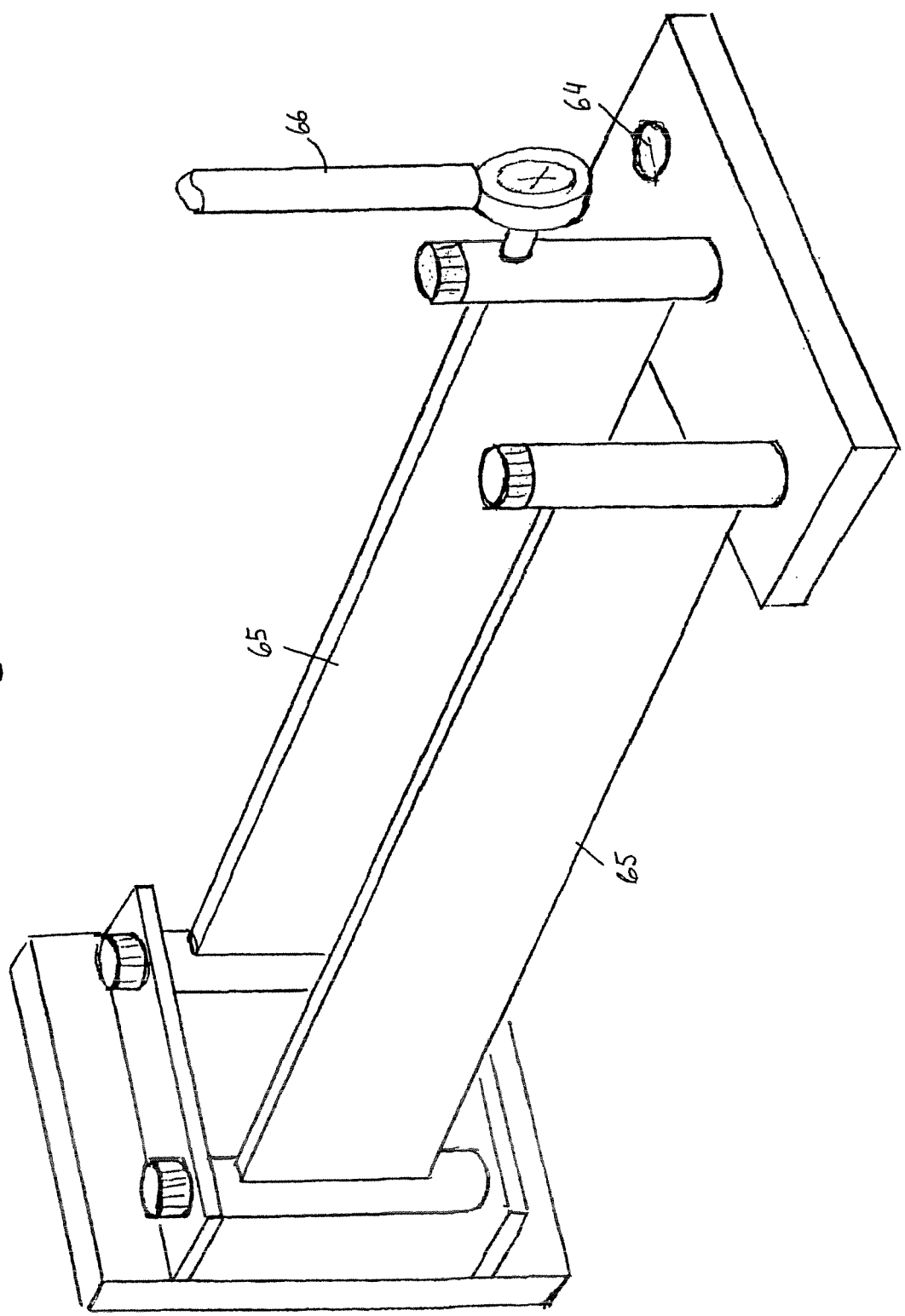
FIG. 14 shows a parallel guidance for the knife in FIG. 13.

The fore-end then passes a knife for free-cutting of the side of the shank bone and the humerus bone until the joint between the humerus bone and the shoulder blade. The knife is shown in FIG. 12 and it corresponds in broad outline to the knife in FIG. 2, where 7 is a forwards directed curve and 8 is a cutting edge. The lower part of the knife under the curve 7 follows an arc of approx. 30.degree. in towards the bone and serves as a catcher. In the present embodiment a stop device is not used, as the gripper 45 has a good grip. The knife is swung inwards from the right in the direction of conveyance, past the gripper and into the shank bone's right free-cut, which has been performed by one of the blades 40. After this, the knife free-cuts and free-scrapes along the shank bone and the humerus bone, and a little around the joint between the humerus bone and the shoulder blade, before it is pulled up and out of the fore-end.

The knife in FIG. 12 is suspended in such a way that it can be moved upwards, downwards and sideways. Furthermore, the knife can be turned and angled during the cutting process around the joint between shank bone and humerus bone, and possibly the joint between humerus bone and shoulder blade. Air cylinders control all three movements.

The knife shown in FIG, 13 has a downwards-protruding part 62, which swings into the left free-cut of the shank bone and cuts free along the bone all the way past the heel part of the shank bone. By means of a pivot 63 the knife is mounted in an opening 64 in a parallel guidance, see FIG. 14. The guidance has two pivoting, parallel arms 65, which in their central position extend across the direction of conveyance for the fore-end and which can be moved upwards and downwards by means of the piston rod 66 in an air cylinder.

Figure 15:
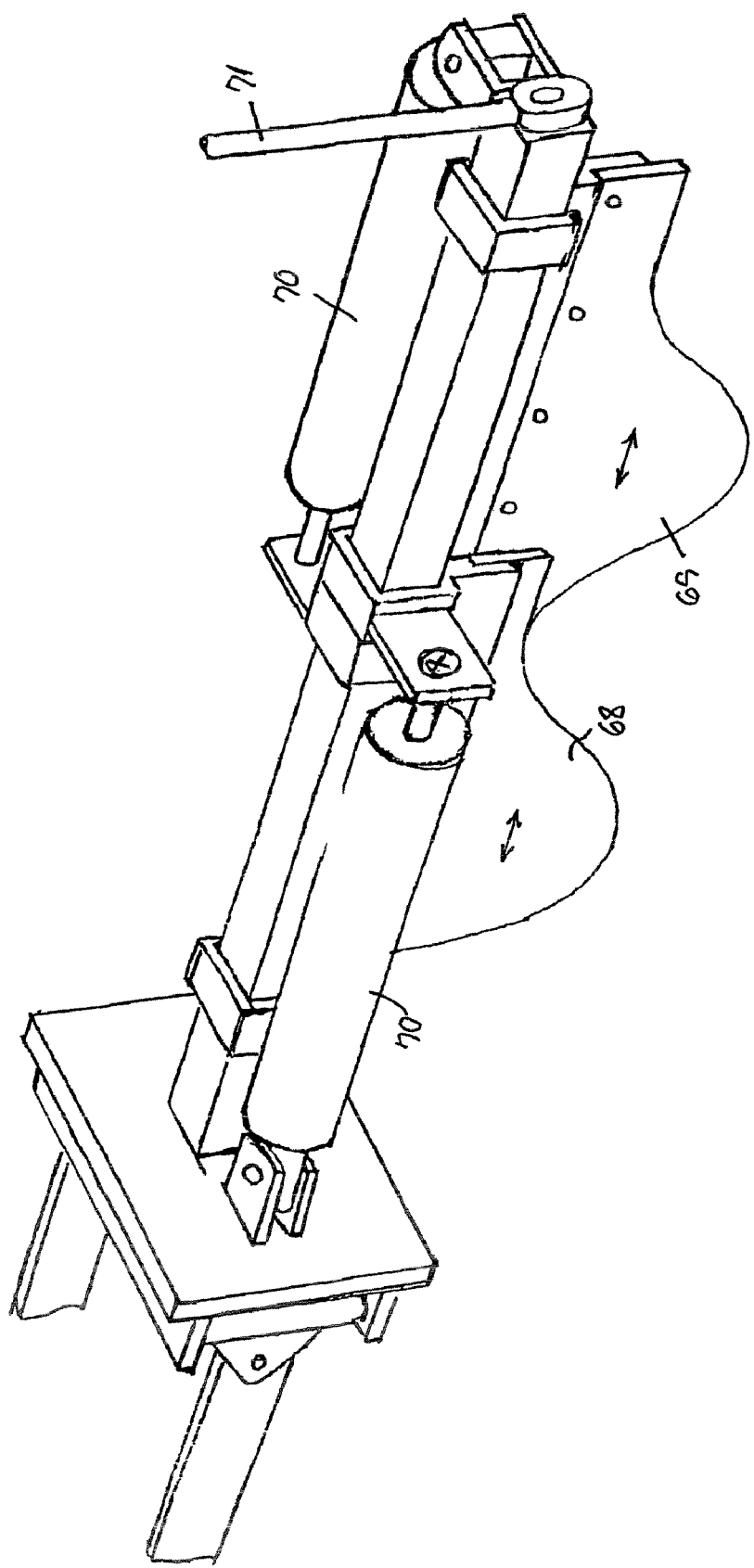
FIG. 15 shows a cutting tool to cut the membranes on top of and on the side of the humerus bone

The fore-end is then transported to a knife tool, which free-cut the membranes on top of and on the side of the humerus bone, see FIG. 15. The tool makes a cut right after the joint between the shank bone and the humerus bone and breaks the membranes on the side of and on top of the humerus bone.

Two knives 68, 69 in the tool can pass closely past each other in a linear, scissors-like movement. The tool is mounted via a parallel guidance to the left side of the rack. In the initial position, the tool hangs over the conveyor 35 and is pulled inwards against a stop by means of a spring, which ensures that the tool always returns to the same initial position.

When the fore-end is in position for processing, the tool strikes down from above, so that the cutting edges of the knives 68, 69 will stand on either side of the humerus bone. The tool is moved with the fore-end. After a given period a scissors-like movement is performed, the knives 68, 69 being moved from either side across the humerus bone by means of their respective cylinders 70. A third cylinder 71, which moves the tool upwards and downwards, acts as air spring. At the conclusion of the cutting operation the tool is pulled up and backwards to the stop, and the knives 68, 69 are returned to the initial position.

The fore-end is then transported to a knife tool, which is designed as shown in FIG. 3 and previously described, and to other knife tools, which have previously been described in connection with the first embodiment of the apparatus according to the invention or perform similar actions in order to free-cut the internal bones.

Prior to the use of the tool in FIG. 4 or a similar tool it may be an advantage to loosen the meat which lies on top of the joint between the humerus bone and the shoulder blade and to put it aside so it is not spoiled. A knife suitable for this purpose can be designed as a very short version of the knife for M. Serratus Ventralis in FIGS. 9-10. It can possibly be angled automatically. The knife is fastened to the right side of the rack.

Figure 16:
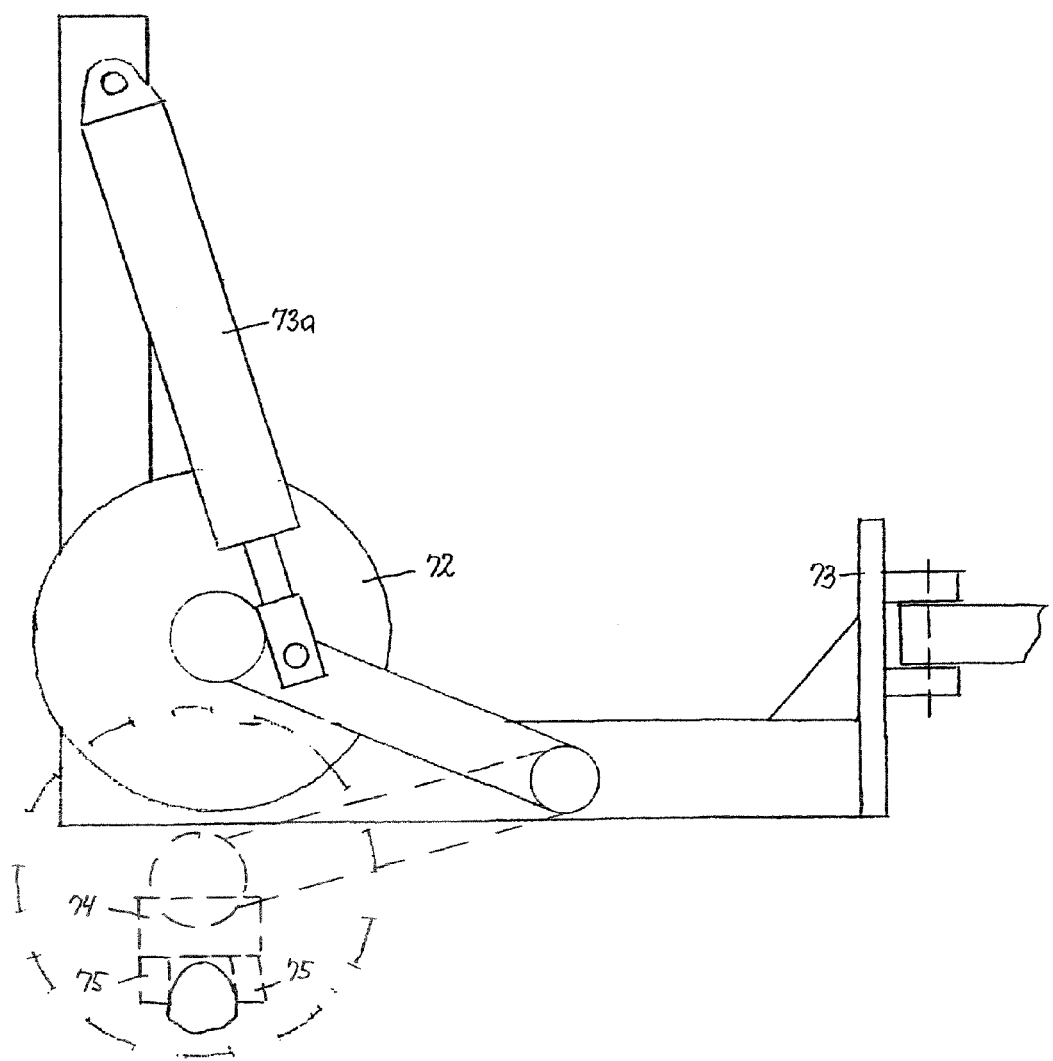
FIG. 16 shows a cutting tool to chop down on the left side of the joint between humerus bone and shoulder blade.
Figure 17:
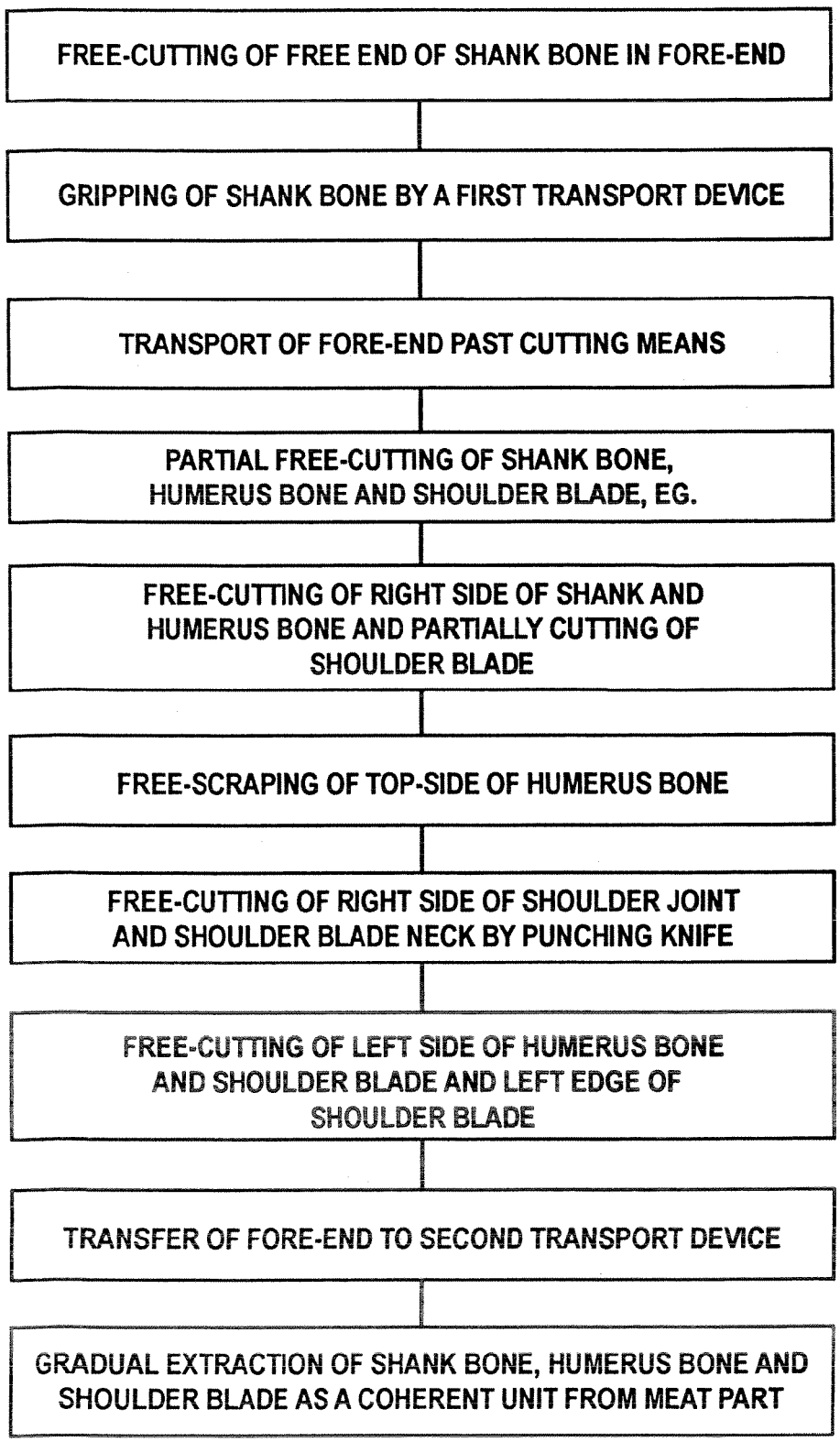
FIG. 17 shows a flow chart illustration of the disclosed method of removing internal bones in a fore-end of a split carcass.

Instead of the punching knife, which is used in the first embodiment of the apparatus according to the invention, a cutting tool can be used which is designed as shown in FIG. 16. The tool has a circular knife 72 and is suspended in a parallel guidance 73 which is fastened to the right side of the rack. The suspension allows the knife to move upwards and downwards by means of an air cylinder 73a and to follow the fore-end in the direction of conveyance. The circular knife is driven by an electric motor via a flexible shaft.

The knife is positioned on the humerus bone by means of a downwards-pointing, backwards-directed arm 74 with two fingers 75. One finger is movable and is kept down by an air spring in form of an air cylinder. On the air cylinder there is a sensor, which registers when the movable finger is actuated.

During the conveyance of the fore-end the arm 74 and the fingers 75 slide up along the humerus bone, by which the parallel guidance is locked by an air cylinder, so that the knife cannot follow the fore-end. When the movable finger meets resistance at the end of the humerus bone it is pressed backwards and the sensor of the air cylinder is activated. This starts a working process, in which the rotary knife 72 chops down into the fore-end after a given time. At the same time as the rotary knife chops down the parallel guidance is released so that the knife arrangement follows the transport movement of the fore-end. At the conclusion of the processing the tool will return to the initial position.

The fore-end is then conveyed to a knife tool, which is designed in the same way as the tool in FIG. 4, but it is laterally reversed in proportion to this. The tool enters down into the track that the tool in FIG. 16 has formed on the left side of the joint between the humerus bone and the shoulder blade, and it scrapes the shoulder blade neck to ensure that the shoulder blade can be extracted.

At the conclusion of the free-cutting of the shank bone, humerus bone and shoulder blade, these bones can be extracted by means of the extraction part, which is shown to the right in FIG. 6. It has a vertical, stationary, round disc 76 with a curve steering part 76a. Opposite the disc runs an extraction arm 77, which has the same centre line as the disc. The arm is driven by an electric motor with frequency converter. On the extraction arm there is a mounting plate, to which three holders with a set of jaws 78 in each have been fastened. The jaws are kept closed by a tension spring. Two rollers on each jaw are in constant contact with the disc 76 and the curve steering part 76a.

When the gripper 45 arrives at the extraction part, the extraction arm 77 is started, which accelerates without hitting the gripper 45. The rollers in the first set of jaws go down in the curve steering part 76a and force the jaws to close around the middle of the shank bone. Then the extraction arm 77 stops for a fairly short period and at the same time the gripper 45 is opened, releasing the shank bone. The gripper is removed by the continued movement of the transport tool by the conveyor. The extraction arm is accelerated up again, and as it continues its movement, the rollers from the other two sets of jaws go down into the curve steering part, so that these sets of jaws close around the humerus bone and the shoulder blade neck respectively.

Under the disc 76 there are two not-shown stop rails which hold back the meat part of the fore-end, while the extraction arm by means of the jaws pulls the bones slantwise upwards and out from the fore-end. At a certain point on the disc the curve steering part ends, causing the jaws to open again and the bones to fall out. After this, the extraction arm continues the movement forwards to the initial position.

It applies to both of the described embodiments of the apparatus according to the invention that the two joints, which connect the bones shall preferably be undercut in order to be able to release the bones from the rest of the fore-end without damaging the meat unnecessarily. The gripper 45 is constructed and mounted in such a way that the shank bone is free of the conveyor belt and lies at a fixed distance from the belt. This has been done in order for cutting tools to be able to enter underneath the shank bone and break the last tendon attachments. The free-cutting operation is done with spring-loaded cutting tools, which are guided according to the position of the gripper 45.

The described tools and apparatuses can perform a partial free-cutting of the shank bone, the humerus bone and the shoulder blade from a right fore-end, preferably a pig fore-end, and subsequently remove these bones from the rest of the fore-end. The internal bones in a left fore-end can be cut free and removed in a similar way by means of laterally reversed tools. The apparatuses can be modified to process fore-ends of other animals.

The processing need not comprise the free-cutting of the shoulder blade as only the shank bone and the humerus bone can be cut free.

The individual tools and the process steps can have different embodiments, which will be clearly seen from the above description. The described embodiments are examples of how an apparatus and a method can be designed in accordance with the invention. However, it is clear that these are only examples of the present invention stated in the claims.

The invention claimed is:

1. Apparatus for use in removal of internal bones from a fore-end of a split carcass, the apparatus comprising:
    a transport tool having grippers adapted to grip around a free end of a shank bone of the fore-end;
    a transport device carrying the transport tool (27a) and moving the transport tool and fore-end along a transport path during a cutting operation; and
    a plurality of cutting tools arranged along the transport path, said cutting tools adapted to cut along the shank bone and the humerus bone to at least partially loosen the shank bone and the humerus bone from the rest of the fore-end as the transport device moves the fore-end along the transport path and past the cutting tools, wherein at least one of the plurality of cutting tools is stationary during the cutting operation.

2. Apparatus according to claim 1, wherein a shoulder blade of the fore-end slides along at least one cutting tool during the cutting operation for loosening the shoulder blade from the rest of the fore-end.

3. Apparatus according to claim 1, further comprising a transport plane supporting the fore-end during the cutting operation.

4. Apparatus according to claim 3, wherein said transport device is a conveyor having a continuous chain constituting said transport plane and comprising said transport tools, each transport tool being provided with grippers to grip around and retain said free end of said shank bone of a fore-end being supplied to an entrance end of the conveyor.

5. Apparatus according to claim 4, wherein said grippers comprise a frame extending generally transversely to said transport path, the frame being adapted to clamp said free end of said shank bone against an anvil or pressure part by displacement of the frame.

6. Apparatus according to claim 1, wherein at least one of the cutting tools is resiliently suspended, so that during the cutting operation, the at least one cutting tool is resiliently loaded against at least one of said shank bone, said humerus bone and said shoulder blade.

7. Apparatus according to claim 1, further comprising an extraction device adapted to remove, after the cutting operation, at least the shank bone and the humerus bone from the fore-end in a direction upwards from the transport plane of the fore-end, and retaining means for retaining the rest of the fore-end at the transport plane while at least the shank bone and the humerus bone are moved in a direction upwards from the transport plane, so that the shank bone, the humerus bone and possibly the shoulder blade are removed from the fore-end.

8. Apparatus according to claim 7, wherein said extraction device is adapted to remove all of the shank bone, the humerus bone and the shoulder blade from the fore-end, and wherein the extraction device comprises three sets of jaws, each set being adapted to clamp a respective one of said three bones.

9. Apparatus according to claim 8, wherein said three sets of jaws are suspended on a disc or an arm, rotating or swinging around a stationary axis and moving the sets of jaws along an arcuate path, the arcuate path extending within a plane generally comprising at least a portion of said transport path leading past said extraction device.

10. Apparatus according to claim 1, wherein the transport tool moves the fore-end relative to said cutting tools during the cutting operation.

11. Apparatus according to claim 10, wherein a cutting force is generated by the transport device and transferred to the fore-end by said grippers of said transport tool.

12. Apparatus according to claim 10, further comprising means for moving at least some of the tools into engagement with the fore-end, said means for moving activated by at least one of said transport tool and said grippers arriving at a predetermined location relative to said means for moving.

13. Apparatus according to claim 1, wherein each of the plurality of cutting tools comprises a knife.

14. Apparatus for use in removal of internal bones from a fore-end of a split carcass, the apparatus comprising:
    a transport tool having grippers adapted to grip around a free end of a shank bone of the fore-end;
    a first transport device carrying the transport tool and adapted to move the fore-end along a transport path during a cutting operation;
    a plurality of cutting tools arranged along the transport path, said cutting tools adapted to cut along the shank bone and the humerus bone to at least partially loosen the shank bone and the humerus bone from the rest of the fore-end as the transport device moves the fore-end along the transport path and past the cutting tools; and
    an extraction device adapted to remove at least the shank bone and the humerus bone from the fore-end after the cutting operation, the extraction device comprising a second transport device and a retaining means, the second transport device for moving at least the shank bone and the humerus bone in a direction upwards from the transport plane of the fore-end, and the retaining means for retaining the rest of the fore-end at the transport plane while the second transport device moves at least the shank bone and the humerus bone in the direction upwards, thereby removing at least the shank bone and the humerus bone from the remainder of the fore-end.

* * * * *